Aug. 16, 1966     C. A. CARPENTER ETAL     3,266,484
BROILER APPARATUS AND FOOD SUPPORT MEANS
Original Filed May 6, 1963
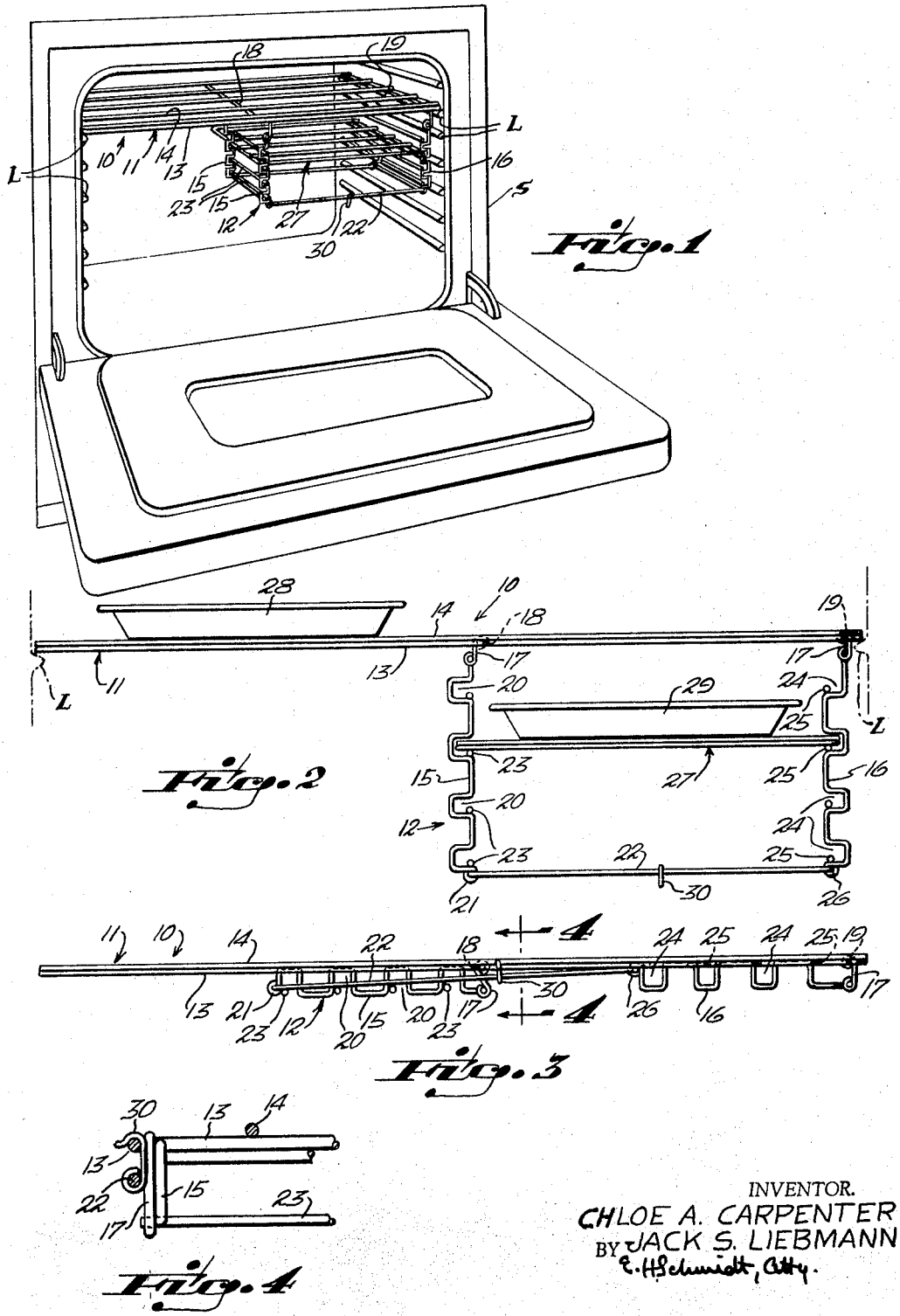
INVENTOR.
CHLOE A. CARPENTER
BY JACK S. LIEBMANN
E. H. Schmidt, Atty.

United States Patent Office 3,266,484
Patented August 16, 1966

---

3,266,484
BROILER APPARATUS AND FOOD SUPPORT MEANS
Chloe A. Carpenter, 1081 Spring Garden Road, Apt. 9, Miami, Fla., and Jack S. Liebmann, 420 Lincoln Road, Suite 206, Miami Beach, Fla.
Original application May 6, 1963, Ser. No. 277,988. Divided and this application Apr. 2, 1964, Ser. No. 357,865
4 Claims. (Cl. 126—337)

This application constitutes a divisional application of patent application Serial Number 277,988 filed May 6, 1963, now abandoned.

This invention relates to meat broiling and is directed particularly to apparatus for simultaneously broiling two or more meat portions to different degrees of "doneness," from rare to well done, in the same length of broiling time.

Heretofore, in broiling meats, such as beefsteak cuts, which are commonly cooked to order to suit the individual taste of the diner, it has been common practice to place individual meat portions at the same distance from the broiler heat element, four or five inches, for example, and turn and remove those portions to be cooked "rare" sooner than those portions to be cooked "medium" and "well done." This practice not only is incorrect in that a broiling distance from the heat element which is proper for cooking a given portion of meat "rare" will result in excess cooking or even burning of the outer surface portions of meat left longer for additional cooking in the attempt to cook "medium" or "well done," but also necessitates close attention on the part of the cook and results in the individual portions being ready for serving at different times, depending upon how long they are cooked.

It is accordingly the principal object of this invention to provide a broiling apparatus by which individual meat portions can simultaneously be properly broiled to different degrees of "doneness," to suit the various tastes of the people for whom the meat is being prepared, and which results in all portions being ready for withdrawal from the broiler and serving at the same time. My invention is based on the fact that in broiling meats, the distance from the broiler heat element, rather than the lengthening of time under the element, is the controlling factor in determining whether a meat portion of given thickness will be cooked rare or well done. Furthermore, the greater the distance from the broiler heat element, the greater the degree of "doneness."

It is accordingly a more particular object of my invention to provide a broiler rack for electric or gas broilers, which includes means for supporting a pair of broiler pans at adjustably different levels so that two or more portions of meat can be broiled at different distances from a common broiler heat element in a stove for different degrees of "doneness" in the same length of time.

It is another object to provide a broiler rack of the above nature which can be used for the replacement of ordinary broiler racks in domestic stoves.

It is still another object to provide a broiler rack of the character described which is collapsable to a size substantially no greater than that of an ordinary rack, so as to be usable as an ordinary support rack in a combination stove for baking or roasting, for example.

Yet another object is to provide a collapsable broiler rack of the above nature which is inexpensive to manufacture, simple in structure and operation, and durable in use.

Other objects, features and advantages of the invention will be apparent from the following description when read with reference to the accompanying drawings. In the drawings, wherein like reference numerals denote corresponding parts throughout the several views:

FIG. 1 is an oblique view of an electric stove with the combination oven-broiler door open and showing a broiler rack embodying the invention in place thereon;

FIG. 2 is a front elevational view of the broiler rack, shown separately and on an enlarged scale, illustrating a pair of broiler pans supported at different levels thereon as in broiling;

FIG. 3 is a front elevational view of the broiler rack in collapsed condition; and FIG. 4 is a vertical cross-sectional view taken along the line 4—4 of FIG. 3 in the direction of the arrows and illustrating details of the locking mechanism.

Referring now in detail to the drawings, 10 in FIGS. 1, 2 and 3 designates a broiler rack embodying the invention, the same being shown in broiling position in a stove S in FIG. 1, supported between a pair of opposed slide ledges L provided in the side walls of the stove as is usual in household range construction.

The broiler rack comprises a main rack 11 and an auxiliary rack support structure 12 arranged below the main rack at one side and operative to be collapsed and locked up against the main rack, as illustrated in FIG. 3, as is hereinbelow more fully described.

The main rack 11 is preferably of ordinary metal wire or rod construction, and comprises a peripheral rectangular frame member 13 of bent wire or rod, of such width as to slide upon and between an opposed pair of side ledges L in a broiler for support thereon, and a plurality of equidistantly-spaced support rods 14 welded at their ends upon the side portions of said frame member and in parallel relation to front and back portions of said frame member and to each other to provide a support base for broiler pans or other cooking utensils.

The auxiliary rack support structure 12, also fabricated of bent wire, is arranged beneath and at one side of the main rack 11, and comprises a first pair of front and back rack support members 15 and a second pair of front and back support members 16 laterally spaced by the same distance from said first pair. As best illustrated in FIG. 2, the front rack support members 15 and 16 are linked at their upper ends through short, bent wire link members 17, to the main rack 11, front to back support rods 18 and 19 being provided in said main rack to receive the upper end loops of said wire link members. The back rack support members 15 and 16 (not visible in FIGS. 2 or 3) are similarly linked at the back of the main rack 11.

The first pair of front and back rack support members 15 are rectangularly bent along their lengths to provide a plurality of equidistantly-spaced recesses 20 and terminate in loops 21 for receiving a bottom frame member 22, as herein more particularly described. Rack or pan support rods 23 extend between the inner lower corners of the front and back rack support members recesses 20, being welded thereat at the ends to provide a unitary structure. Similarly, the second pair of front and back rack support members 16 are bent along their lengths to provide a plurality of equidistantly-spaced recesses 24 equal in number to and horizontally aligned with the recesses 20; and rack or pen support rods 25 are welded between the inner lower corners of the corresponding recesses of said front and back rack support members. Loops 26 are found at the lower ends of the front and back rack support members 16. The rectangular bottom frame member is looped through the loops 21 and 26 at the lower ends of each rack support member 15, 16, said bottom frame being of such size as to permit the support members 15, 16 to hang vertically when in use, as illustrated in FIG. 2.

As illustrated in FIG. 2, the recesses 20, 24, with their respective rack or pan support rods 23, 25 permit an auxiliary rack 27 to be placed in spaced parallel relation below the main rack 11, at preselected distances determined by the number of recesses provided in the rack support members 15, 16. In use, the main rack 11 will be placed in the broiler at the proper distance from the heat element to cook the meat portion to be least cooked on it in its pan 28, as illustrated in FIG. 2, and the meat portion to be more thoroughly cooked will be placed in the auxiliary rack support structure 12 at a greater distance from the heat element depending upon the degree to which it is to be cooked, the greater the distance, the greater the thoroughness of cooking for the proper length of cooking time. With such an arrangement, the meat portions can be placed in the oven at the same time, turned at the same time, and withdrawn for eating when done at the same time, each portion being cooked to the desired degree of "doneness." While the rack 27 is shown in FIG. 2 supported by the auxiliary rack support structure 12 and supporting the second pan 29, a pan wide enough to be supported entirely by its side flanges could alternatively be used.

When not in use, the auxiliary rack support structure 12 can be collapsed by swinging up against the underside of the main rack 12 and locking in place at the front and the back by means of bent wire hooks 30 looped about the front and back portions of the bottom frame member 22 (see FIG. 4).

While we have illustrated and described herein only one form in which the invention may conveniently be embodied in practice, it is to be understood that this example is given by way of example only and not in a limiting sense. For example, instead of having only one auxiliary rack support structure, three or more could be provided for broiling meat portions to three or more degees of "doneness" in a common broiler in the same interval of time. The invention, in brief, comprises all the modifications and embodiments coming within the scope of the following claims.

What we claim as new and desire to secure by Letters Patent is:

1. Apparatus for broiling a plurality of meat portions to different degrees of "doneness" in the same time interval comprising a cooking range having a broiling chamber and a broiler heat element in the upper portion of said chamber, a main rack in said chamber and having means for vertical adjustment thereof to various positions under said broiler heat element, an auxiliary rack and an auxiliary rack support mechanism carried by said main rack at one side thereof and including means for supporting said auxiliary rack, selectively, at a plurality of spaced parallel positions under said main rack.

2. Broiling apparatus as defined in claim 1, wherein said main rack and said auxiliary rack each comprise a bent-wire frame and spaced parallel wire members fixed to said frames.

3. Apparatus for broiling a plurality of meat portions to different degrees of "doneness" in the same time interval comprising a main rack adapted to fit in adjusted vertical position under a broiler heat element, an auxiliary rack and an auxiliary rack support mechanism carried by said main rack at one side thereof and including means for supporting said auxiliary rack, selectively, at a plurality of spaced parallel positions under said main rack, said auxiliary rack support member comprising two pairs of front and back support members pivotally secured at one end to said main rack and swingable up against the underside of said main rack.

4. Broiling apparatus as defined in claim 3, wherein said front and back support mmebers each are formed of bent wire providing a plurality of aligned vertically spaced groups of recesses for receiving edge portions of said auxiliary rack.

References Cited by the Examiner
UNITED STATES PATENTS

| | | | |
|---|---|---|---|
| 369,831 | 9/1887 | Allyn | 126—339 |
| 618,499 | 1/1899 | Edwards | 126—275 |
| 2,002,339 | 5/1935 | Copeman | 108—106 X |
| 2,207,115 | 7/1940 | Carr | 126—339 X |
| 2,875,016 | 2/1959 | Fry | 126—337 X |

FREDERICK L. MATTESON, JR., *Primary Examiner.*

E. G. FAVORS, *Assistant Examiner.*